Sept. 8, 1925. 1,553,135
T. J. BYRNES
ELECTROCUTING APPARATUS
Filed Feb. 7, 1921 2 Sheets-Sheet 1
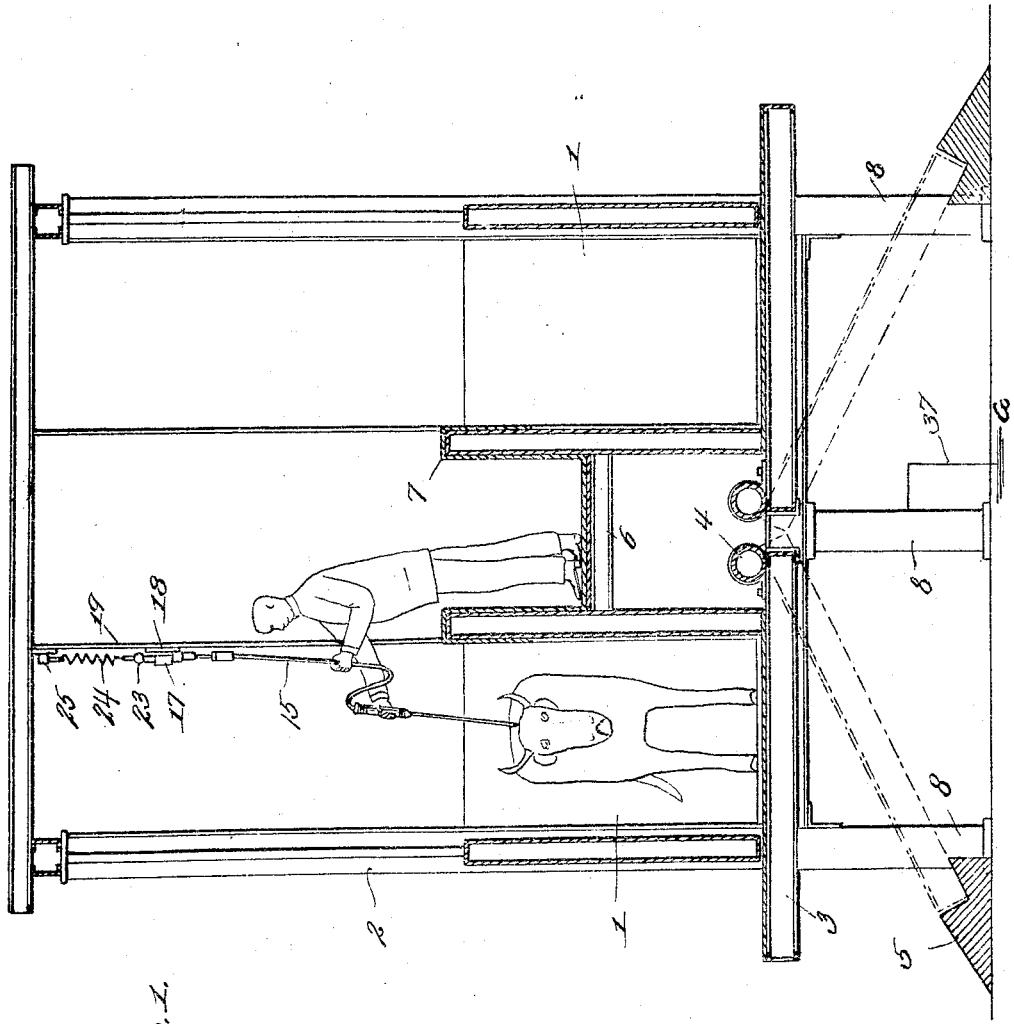

Sept. 8, 1925.
T. J. BYRNES
1,553,135
ELECTROCUTING APPARATUS
Filed Feb. 7, 1921
2 Sheets-Sheet 2
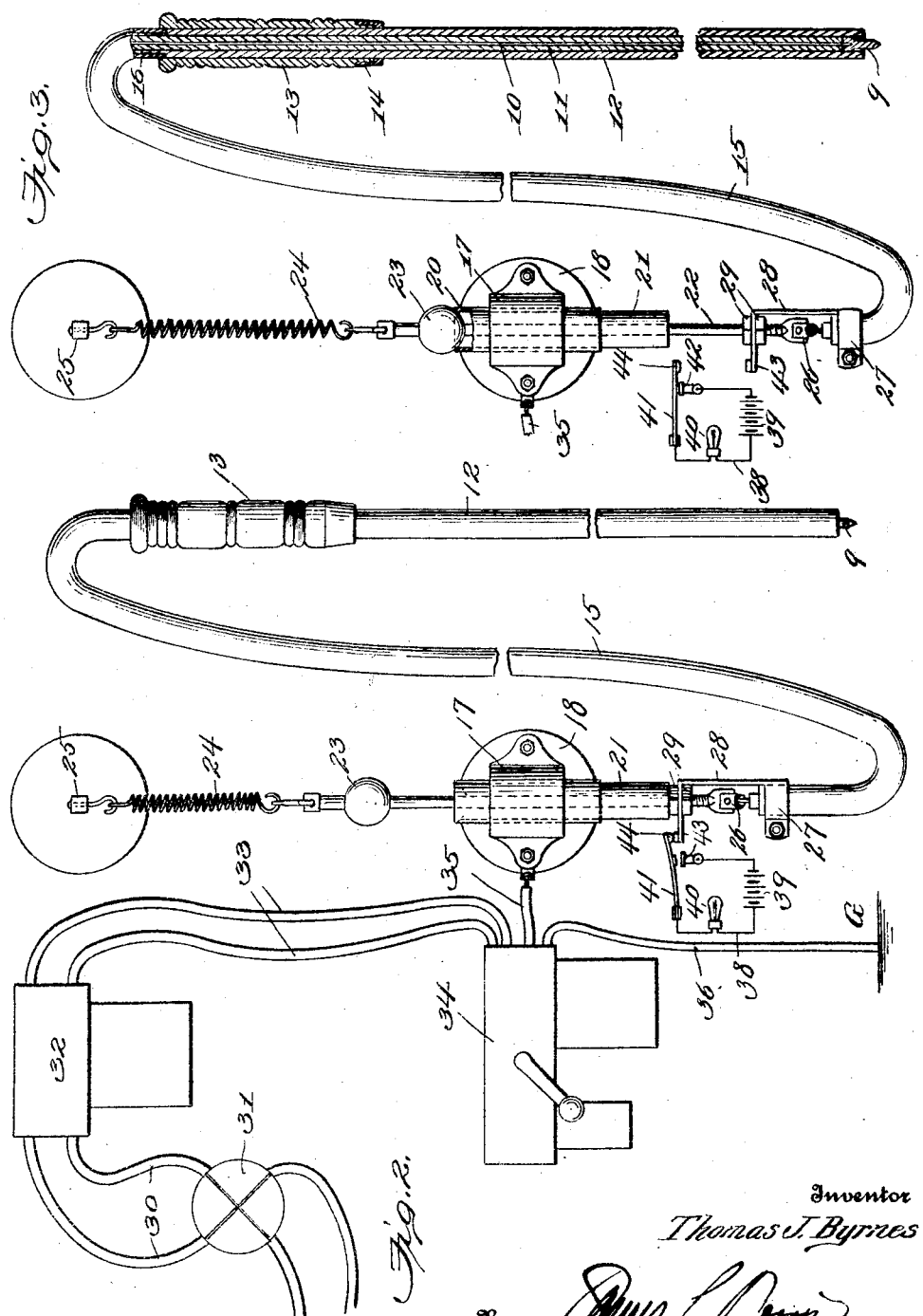
Inventor
Thomas J. Byrnes Patented Sept. 8, 1925.

1,553,135

UNITED STATES PATENT OFFICE.

THOMAS J. BYRNES, OF OMAHA, NEBRASKA.

ELECTROCUTING APPARATUS.

Application filed February 7, 1921. Serial No. 443,104.

*To all whom it may concern:*

Be it known that I, THOMAS J. BYRNES, a citizen of the United States, residing at Omaha, in the county of Douglas and State of Nebraska, have invented new and useful Improvements in Electrocuting Apparatus, of which the following is a specification.

The present invention relates to apparatus for executing animals by electrocution, and the primary object of the invention is to provide a novel and improved apparatus of this character, whereby animals, whether tame or difficultly controllable, may be executed practically instantaneously and in rapid succession, with practically no danger to the operator, the invention being particularly applicable to the execution of cattle or other animals in slaughter houses which usually require the expeditious execution of a large number of cattle daily, although it will be understood that the invention is also applicable to the execution of animals of all kinds and sizes, whether tame or ferocious, with safety to the operator.

To these and other ends, the invention consists in certain improvements and combinations and arrangements of parts, all as will be hereinafter more fully described, the features of novelty being pointed out particlarly in the claims at the end of the specification.

In the accompanying drawing—

Figure 1 represents a transverse vertical section through a stall or cage equipped with electrocuting apparatus constructed in accordance with the present invention;

Figure 2 is a detail view of the electrocuting apparatus showing its electrical connections, the electrode or prod-pole being uncharged; and Figure 3 is a view similar to Figure 2, but showing the parts in position to charge the electrode or prod-poles.

Similar parts are designated by the same reference characters in the different views.

The present invention is applicable generally to the execution of animals of various kinds and sizes, irrespective of whether such animals are tame or easily controllable, or whether they are ferocious or difficult to control, the invention being particularly adapted to meet the requirements of modern slaughter houses which demand the expeditious execution of a large number of cattle or animals daily. The preferred embodiment of the invention is herein shown and described, but it is to be understood that the invention is not restricted to the precise construction and arrangement shown, as equivalent constructions and arrangements are contemplated and these will be included within the scope of the claims.

The cattle or other animals to be executed are brought to a stall or cage which may be of any suitable construction that will confine the animal within the range of the electrocuting device, under the manipulation of the operator. It is preferable, however, to provide a stall 1 which may advantageously form a continuation of a runway along which the cattle or animals may be driven or otherwise conducted to the electrocuting apparatus, this stall, as shown, being supported by a metal or other suitable framework 2 and the bottom of the stall being preferably in the form of a trap-door 3 which is hinged or pivoted at one end to a pivot 4 and it may have a suitable latch to normally hold it in its upper position to form a bottom or floor for the stall, an abutment 5 being located to receive the free end of the trap-door, when the latter is released and descends under the weight of the animal thereon, the trap-door then serving as a chute for ejecting the electrocuted animal from the stall, whereupon the trap-door may rise or return to its normal elevated position to form a platform or floor to receive the next animal to be electrocuted. In order to increase the capacity of the apparatus, two of these stalls may be placed side-by-side on the frame-work, as is shown in Figure 1, and an intermediate platform 6 is provided on which the operator of the electrocuting device may stand, the platform for the operator being preferably covered with an insulating mat or other insulating material, and this insulating material also may cover the adjacent side walls of the stalls, as is shown at 7. The floor of the stall serves as one of the electrodes employed in the electrocution of the animals, for which purpose the trap-door or floor of the stall is constructed preferably of metal, and the posts 8 on which the frame-work rests, are also preferably constructed of metal and are embedded in the ground so that they will complete one side of the electrocuting circuit.

The electrocuting device comprises an electrode capable of manipulation by the operator to bring it into contact with the animal to be electrocuted, thereby completing the electrocuting circuit through the body of the animal. Preferably, this electrode is in the form of a prod-pole which, as shown, comprises a contact tip 9 which projects from one end of the prod-pole and is connected to a wire or other conductor 10 for the electrocuting current, a covering of insulating material 11, which surrounds the wire or conductor 10, an outer insulating sleeve 12 preferably of rigid material, such as fibre, hard rubber or the like, and a handle 13 which surrounds the sleeve 12 and is fixed thereon by a ferrule 14, the handle being composed preferably of wood or other suitable insulating material. A flexible cable 15 which consists of a continuation of the wire or conductor 10 and its insulating covering 11, enclosed within a flexible sheath or insulating hose or tubing 16, is attached to the end of the prod-pole opposite to the contact tip or point 9 and serves to conduct the electrocuting current to the prod-pole.

The present invention provides current-controlling means, whereby the operator may, with ease and facility, charge the prod-pole with the electrocuting current when the contact tip has been brought into contact with the animal, while at other times, the prod-pole may be uncharged. The current-controlling means shown in the present instant comprises a clamp or bracket 17 which is preferably secured to an insulating base 18 attached to a support 19 at a suitable elevation above the stall, this clamp or bracket having a sleeve 20 of bronze or other suitable conducting material clamped or otherwise held therein, and the sleeve 20 has a fibre or other insulating bushing 21 secured within it. A rod 22 of electrical conducting material is reciprocable longitudinally in the bushing 21, this rod carrying a ball 23 or other suitable form of contact which is movable into and out of engagement with the upper end of the electrical conducting sleeve 20, in consequence of vertical reciprocation of the rod 22. A tension spring 24 is attached to the upper end of the rod 22 and to a fixed projection 25 located on the support 19 above the current-controlling device, the spring acting to draw the rod 22 upwardly to break the contact between the ball 23 and the sleeve 20 and to hold the ball 23 normally out of contact with the sleeve 20. The rod 22 is connected to the wire or conductor 10 of the prod-pole, as indicated at 26, and the flexible cable 15 is connected by a clamp or equivalent device 27 having an extension 28 which is secured to the rod by the nuts 29. From the construction described, it will be understood that the operator grasping the handle 13 of the prod-pole with one hand, is able to manipulate the prod-pole with ease and facility to bring the contact tip 9 thereon into contact with the animal to be executed, and this may be accomplished without difficulty, even though the animal may show great activity in its movements, as it is only necessary to bring the contact tip 9 with a light touch against the body of the animal. Normally the contact tip is uncharged, but in manipulating the device, the operator holds the cable 15 and at the moment when the contact tip has been brought into contact with the body of the animal, the cable 15 is pulled downwardly. This movement of the cable lowers the rod 22, thus bringing the ball 23 or equivalent contact into engagement with the conducting sleeve 20, and as this sleeve 20 is charged with the electrocuting current, as will be hereinafter explained, the electrocuting current will charge the contact tip 9 and as the animal stands or rests on the floor or platform 3, which is connected to the other side of the charging circuit, the charging circuit will be completed through the body of the animal and the animal will, in consequence, be electrocuted practically instantaneously, the current flow being required for only a short period, usually from two to five seconds. The cable 15 is permitted to ascend when electrocution is complete, in consequence of which the spring 24 will elevate the contact ball 23, thereby disengaging from the conducting sleeve 20 and interrupting the flow of electrocuting current to the contact tip 9. It will be understood that an operation substantially like that just described, may be repeated in rapid succession upon the cattle or animals, so that a large number of cattle or animals can be executed expeditiously and with facility.

Electrocuting current at the necessary voltage, can be supplied to the apparatus from any suitable source. As shown in Figure 2, primary current is supplied through primary conductors 30 and a primary circuit switch 31 to a transformer 32 which is capable of stepping up the current to the requisite voltage, and the secondary conductors 33 from the transformer lead into preferably a master switch 34 which may be of any suitable or well known type capable of interrupting the circuit, should the secondary circuit be overloaded by the accidental bringing of the contact tip 9 of the prod-pole into short circuit with the floor or platform 3, or any other part connected to the opposite side of this circuit. A conductor 35 leads from the switch 34 to the clamp or bracket 17, whereby the conducting sleeve 20 of the circuit-controller is charged with current from one terminal of the transformer, and another conductor 36 is connected to the ground G, or it may be directly connected to the frame-work 2 which contains or supports the electrocuting coil. If desired, one of the posts 8 which supports the electrocuting stall may be connected by a conductor 37 to a ground G¹, it being understood that in either case the floor or platform of the electrocuting stall is connected to one terminal of the transformer and the contact tip of the prod-pole is connected to the other terminal of the transformer, the secondary circuit of the transformer being completed when the contact tip of the prod-pole is brought into contact with the animal standing or resting on the floor or platform of the stall, and the circuit-controller for this circuit is closed by manipulation of the cable to which the prod-pole is attached.

It may be desirable in some cases to provide means for indicating the periods when the prod-pole is charged with the electrocuting current. To accomplish this result, a local circuit 38 may be provided which contains a battery or other source of electric current 39 and a suitable signal, that shown being in the form of an electric lamp 40. This circuit also includes a switch which may be in the form of a spring contact arm 41 and a contact point 42, the contact arm 41 normally tending to move into engagement with the contact point 4 and thereby complete the local circuit 38 to illuminate the lamp 40, or otherwise operate the signal or indicator used. The vertically movable rod 32 of the circuit controller is provided with a projection 43 which is arranged to come into engagement with a projection 44 on the contact arm 41, under the action of the spring 24 when the rod 22 is in its normal elevated position, and the circuit to the prod-pole is broken, the parts being shown in this position in Figure 2. When, however, the cable 15 is pulled downwardly or tensioned to complete the electrocuting circuit to the prod-pole, the projection 43 is carried away from the projection 44, in consequence of which the contact arm 41 will move into engagement with the contact 42, thus completing the local circuit 38, and the signal will continue operative as long as the circuit controlling rod 22 is in its circuit-closing position, but the signal will cease to operate when the circuit-controlling rod 22 is retracted by the spring 24 to interrupt the supply of electrocuting current to the prod-pole.

Animal electrocuting apparatus provided by the present invention is capable of use with great facility in the electrocution of animals of various kinds and sizes, irrespective of whether such animals are tame or ferocious, it being necessary only that the portable or freely movable electrode in the form substantially of a prod-pole be brought with a light touch against the body of the animal and a pull applied to the cable, while the animal is standing or otherwise resting on or against the other electrode which most conveniently is formed by the floor of the stall into which the animal is conducted for execution. Moreover, the operator is not subject to danger either from the animal, owing to the fact that a light touch only of the movable electrode is necessary, or from the high-tension current usually employed, the movable electrode being uncharged except at the moments during which it is being used in the actual electrocution of each animal. Obviously, apparatus such as that herein described, enables a large number of animals to be executed with great expedition, and hence it is well suited to the requirements of modern slaughter houses.

I claim as my invention:—

1. An animal electrocuting apparatus comprising a portable electrode adapted to be brought into contact with the animal to be electrocuted, a conductor for supplying current to said electrode, and a circuit controller governed by movement of said conductor.

2. An animal electrocuting apparatus comprising a freely movable prod-pole constituting an electrode capable of being brought into contact with the animal to be electrocuted, a conductor for supplying current to the prod-pole, and means governed by endwise movement of said conductor for controlling the supply of current to the prod-pole.

3. An animal electrocuting apparatus comprising a circuit for the electrocuting current, a freely movable electrode connected by a conductor to said circuit and adapted to be brought manually into touch with the body of an animal to be electrocuted, and means actuated by tension on said conductor for causing current to be supplied to said freely movable electrode.

4. An electrocuting apparatus comprising a circuit for the electrocuting current, an electrode which is portable to bring it into touch with a subject to be electrocuted, a conductor for supplying current to the portable electrode and means operative to close said circuit while said conductor is tensioned and for opening said circuit while said conductor is relieved of said tension.

5. An animal-electrocuting apparatus comprising a circuit for the electrocuting current, a portable electrode attached to a conductor connected to said circuit and freely movable manually to bring it into touch with an animal, a switch for closing said circuit to supply current to the portable electrode when said conductor is moved in one direction, and means normally acting to move said conductor in a direction to actuate the switch to open said circuit.

6. An electrocuting apparatus comprising a circuit for the electrocuting current, an electrode connected to one side of said circuit and freely movable manually to bring it into contact with a subject to be electrocuted, and said movable electrode being connected to a flexible endwise movable member, and a circuit controller for said circuit actuated by said member.

7. An electrocuting apparatus comprising a circuit for the electrocuting current, co-operative electrodes for the respective sides of said circuit, a flexible endwise-movable cable connecting one of said electrodes to said circuit, and a circuit-controller connected in said circuit and governed by said cable.

8. In an electrocuting apparatus, the combination of an electrode in the form of a freely movable prod-pole, a circuit controller therefor, and a flexible member electrically and mechanically connecting said electrode to said circuit controller and governing the operation of the circuit controller.

9. In an electrocuting apparatus, the combination of an electrode, a circuit-controller therefor including a reciprocatory controlling member, and a flexible member which electrically connects said electrode to said circuit-controller and which is operatively connected to said reciprocatory member to actuate it.

10. In an electrocuting apparatus, the combination of an electrode, a circuit controller for the electrocuting current, means for actuating the circuit controller to supply and interrupt the electrocuting current relatively to said electrode, and a signal co-operative with the circuit controller and operative to indicate when the electrode is charged with the electrocuting current.

11. In an electrocuting apparatus, the combination of an electrode, a circuit controller therefor including a reciprocatory controlling member, a flexible member electrically connecting the electrode to the circuit controller and operatively connecting it to said reciprocatory member, and an electric signal for the circuit controller governed by the position of said reciprocatory controlling member.

12. In an electrocuting apparatus, an electrode having a flexible conducting cable attached thereto, and a circuit controller for the electrode comprising a stationary conducting sleeve, a reciprocatory rod movable axially in said sleeve and having a contact to engage the top thereof, said member being connected to said flexible cable whereby endwise movement resulting from tension thereon will move said reciprocatory member to bring the contact thereon into engagement with said sleeve, and a spring acting on said member to disengage the contact thereon from said sleeve.

13. An animal electrocuting apparatus comprising a freely movable prod pole having an electrode in its end adapted to be brought into contact with the animal to be electrocuted, and means including a circuit controller operative by an endwise thrust of the prod pole to supply electrocuting current to the electrode.

14. An animal electrocuting apparatus comprising an endwise movable prod pole having a contact tip at its forward end adapted to be brought into contact with the animal to be electrocuted, and current supply means for the contact tip including a circuit controller operative in consequence of a forward thrust of the prod pole to supply electrocuting current to the contact tip.

In testimony whereof I have hereunto set my hand.

THOMAS J. BYRNES.